(12) United States Patent
Gaj-Jablonski

(10) Patent No.: US 10,718,210 B2
(45) Date of Patent: Jul. 21, 2020

(54) ENGINE CYLINDER ASSEMBLY AND COUNTER-ROTATING COMBUSTION ENGINE CONSTRUCTED WITH THE USE OF IT

(71) Applicant: Wojciech Gaj-Jablonski, Oakville (CA)

(72) Inventor: Wojciech Gaj-Jablonski, Oakville (CA)

(*) Notice: Subject to any disclaimer, the term of this patent is extended or adjusted under 35 U.S.C. 154(b) by 0 days.

(21) Appl. No.: 16/330,167

(22) PCT Filed: Sep. 1, 2017

(86) PCT No.: PCT/PL2017/000080
§ 371 (c)(1),
(2) Date: Mar. 4, 2019

(87) PCT Pub. No.: WO2018/044184
PCT Pub. Date: Mar. 8, 2018

(65) Prior Publication Data
US 2019/0186263 A1 Jun. 20, 2019

(30) Foreign Application Priority Data
Sep. 2, 2016 (PL) ..................................... P.418544

(51) Int. Cl.
*F01B 1/08* (2006.01)
*F01B 17/02* (2006.01)
(Continued)

(52) U.S. Cl.
CPC ................ *F01B 1/08* (2013.01); *F01B 9/026* (2013.01); *F01B 17/02* (2013.01); *F01B 25/02* (2013.01)

(58) Field of Classification Search
CPC .. F01B 1/08; F01B 9/026; F01B 17/02; F01B 25/02
(Continued)

(56) References Cited

U.S. PATENT DOCUMENTS 3,465,161 A * 9/1969 Cutkosky ............. H02K 7/1884
290/1 R
5,816,202 A * 10/1998 Montresor ............. F02B 33/14
123/61 R
(Continued)

FOREIGN PATENT DOCUMENTS

WO 9849434 A1 11/1998
WO 0181743 A1 11/2001
(Continued)

OTHER PUBLICATIONS

International Search Report for PCT/PL2017/000080, prepared by the Visegrad Patent Institute / Branch Office Poland, dated Dec. 19, 2017, 2 pages.

*Primary Examiner* — Syed O Hasan
(74) *Attorney, Agent, or Firm* — Own Innovation; James W. Hinton

(57) ABSTRACT

A cylinder assembly includes a cylinder with an inlet channel of compressed air and an outlet channel of exhaust gas located in the middle which is closed by a head and a partition. One end of a push rod goes through a linear slide bearing located in the partition. A working piston is rigidly embedded on the push rod. Bottom and top compensating pistons are separated from the working piston by spiral compensating springs. A counter-rotating combustion engine including a crank mechanism is connected to two oppositely directed identical cylinder assemblies via an engine case. The crank mechanism constitutes a crankshaft having two crank half shafts lying opposite each other and connected rotationally. The crank mechanism includes two
(Continued)

pairs of connecting rods whose ends are rotationally connected to one of crank half shafts via a rotary shaft. The other ends of the connecting rods are connected to one of two shafts, each connected to a push rod of a cylinder assembly.

6 Claims, 3 Drawing Sheets

(51) Int. Cl.
*F01B 25/02* (2006.01)
*F01B 9/02* (2006.01)

(58) Field of Classification Search
USPC ..... 123/55.2, 51 A, 51 AC, 662, 46 R, 61 R, 123/52.3
See application file for complete search history.

(56) References Cited

U.S. PATENT DOCUMENTS

| | | | |
|---|---|---|---|
| 6,854,429 B2 | 2/2005 | Gelfand | |
| 7,194,989 B2 * | 3/2007 | Hallenbeck | F01L 11/02 123/56.1 |
| 8,397,685 B2 * | 3/2013 | Lowi | F02B 75/28 123/50 A |

FOREIGN PATENT DOCUMENTS

| | | | |
|---|---|---|---|
| WO | 2013143676 A1 | 10/2013 | |
| WO | 2015133916 A1 | 9/2015 | |

\* cited by examiner

ENGINE CYLINDER ASSEMBLY AND COUNTER-ROTATING COMBUSTION ENGINE CONSTRUCTED WITH THE USE OF IT

CROSS-REFERENCE TO RELATED APPLICATION

This application is the U.S. national phase of PCT Application No. PCT/PL2017/000080 filed on Sep. 1, 2017, which claims priority to PL Patent Application No. P. 418544 filed on Sep. 2, 2016, the disclosures of which are incorporated in their entirety by reference herein.

The field of the invention relates to an engine cylinder assembly and a counter-rotating combustion engine constructed with the use of said assembly which is directed to driving land, aerial and water vehicles as well as various kinds of machines.

An internal combustion engine which is known from the publication of the Polish patent application No P. 407365 contains a cylinder fastened to an engine case and it is closed from below by a partition, whereas an inlet channel of compressed air and an outlet channel of exhaust gas are located in the middle of said cylinder. There is a fuel injector and an ignition element in the form of a sparking plug or a heating plug situated in pairs in a top wall of the cylinder. A linear slide bearing, which is resistant to high temperatures, is embedded in the middle of the partition and it is equipped from below with a sealing element. A push rod in the form of a steel ground shaft is led through the linear slide bearing together with the sealing element. A top end of said shaft is rigidly connected to a double-acting reciprocating piston, whereas its bottom end is connected in an oscillatory way to a connecting rod located in a crankcase. The other end of the connecting rod is connected in an oscillatory way to a groove of a crankshaft.

A combustion engine with a double-acting piston which is known from the patent description U.S. Pat. No. 6,854,429 comprises at least one cylinder with a double symmetrical piston located therein which divides free space of the cylinder into two combustion chambers. Bilateral heads which close the cylinder are equipped with fuel admission valves, exhaust valves and an ignition element in the form of a sparking plug or a heating plug. There is a push rod rigidly embedded on the one side of the double piston. Said push rod is projected out the cylinder via a sealed hole in a partition which separates the cylinder from an engine case. One end of said rod is connected to a stabilizer yoke which is connected to a power transmission yoke, while in the place where said yokes are connected there is an arm of a stabilization limiter fastened in an oscillatory way which is attached to an engine case by its other side. The power transmission yoke is connected by its other end to a crankshaft which constitutes a component of a crank assembly. There is a flywheel at the one end of said crankshaft and a timing wheel at the other end which is connected to a camshaft through a timing belt. An oil circulation system in a lubrication system supplies oil to space formed between a cylindrical necking in the middle of the piston and the central part of the cylinder. Subsequently oil is supplied to an oil sump through a system of channels located inside the piston. Then oil goes through a groove located in an axis of a piston rod. Valves of heads which close the cylinder are steered by cams embedded on the timing wheel with the use of push rods in conjugation with work of sparking plugs. The engine operates in a four-stroke cycle alternately for each of the combustion chambers every 180 degrees of a crankshaft rotation.

Furthermore, crank mechanism in a counter-rotating internal combustion engine which is known from the patent application No 01/81743 under the PCT comprises two halves of a crankshaft that are situated coaxially and rotate in opposite directions. Each half is connected to one of two opposite cylinders. Synchronization of a motion of both halves of the crankshaft is realized with the use of an auxiliary shaft which comprises appropriately chosen toothed wheels at its ends. The auxiliary shaft is coupled with one half of the crankshaft by its one side with the help of two identical cylindrical wheels, whereas by its other side it is coupled with the second half of the crankshaft via a transmission which comprises three smaller cylindrical wheels. The parallelism of an auxiliary shaft axis and a common axis of crankshaft halves is maintained.

Furthermore, according to the patent description of an internal combustion engine No WO 98/49434 under the PCT steam is introduced under pressure to particular engine chambers. Subsequently steam is split into hydrogen and oxygen with the use of platinum and provided that there are appropriate physical conditions. Then hydrogen and oxygen are introduced to a combustion chamber of the engine as an extra component of a standard fuel mixture.

Given the construction of internal combustion engines in the previous solutions, the expansion of gases derived from combustion of a fuel-air mixture takes place in order to transform it into mechanical energy. The process of combustion is relatively slow and it is dependent on a kind of fuel as well as a quantity of oxygen in the fuel-air mixture. Therefore, multi-cylinder engines are created so as to obtain large force on a crankshaft. It results from the fact that collecting a large quantity of fuel as a consequence of limited speed of combustion in one cylinder of high capacity entails only partial combustion and causes emission of the fuel mixture that is not fully burnt into the atmosphere, which not only has an adverse impact on the environment, but also it is pointless economically. Thus, large quantities are divided into smaller portions supplied to a number of smaller cylinders in order to obtain a substantial force. Detonation of fuel could serve as a solution to the aforementioned problem given that it is a kind of rapid combustion which triggers a lot of energy in a short period of time. However, in engines that have been constructed so far it causes their destruction or serious damage. An engine case is likely to break apart in extreme cases, for example when hydrogen explodes in the oxygen atmosphere. That is the rationale why detonation is avoided. In internal combustion engines of the prior art an ignition of the fuel-air mixture must occur before TDC so as to fully utilize the process of complete combustion, which at times is an obstacle for an engine operation cycle and contributes to a relatively slow process of combustion. Initial compression in gasoline engines uses a ratio ranging from 1:10 to 1:14, whereas in diesel engines a compression ratio is between 1:19 to 1:23. Both the operation in such engines and the beginning of pressure of a piston which forces a rotary motion of a crankshaft occur when an arm of force on the crankshaft is the smallest, which means that a connecting rod is located close to TDC, and it decreases as gases of the combustion process are released, which usually takes place at the angle of 150° and finishes 180° at the longest of the crankshaft rotation. Thus, this energy rapidly decreases at the angle of approx. 150° of the crankshaft rotation following the expansion of gases of the combustion process, which leads to the lack of pressure on the crankshaft.

The objective of the present invention is to construct a combustion engine which is devoid of obstacles mentioned above. It can be achieved in the construction of engine cylinder assemblies according to the invention, which facilitates detonation of hydrogen fuel.

An engine cylinder assembly according to the present invention comprises a cylinder which is closed by a head at one side, whereas at the engine case side it is closed by a partition with a linear slide bearing of a partition located in the middle. One end of a push rod goes through the slide bearing of the partition, projects out of the cylinder and it is connected to a connecting rod in an oscillatory way. A working piston is rigidly embedded on said push rod inside the cylinder. There is an inlet channel of compressed air and an outlet channel of exhaust gas in the middle of the cylinder. Furthermore, a top fuel injector, a top steam injector and a top ignition element are situated in the head, whereas a bottom fuel injector, a bottom steam injector and a bottom ignition element in the form of a sparking plug are situated in the partition. A bottom compensating piston sealed to the cylinder is located on the push rod section between the working piston and the partition via the linear bottom slide bearing. There is an adjoining bottom spiral spring between the working piston and the bottom compensating piston. The bottom compensating piston divides space of the cylinder between the working piston and the partition into a bottom compensating chamber and a bottom combustion chamber. A top compensating piston sealed to the cylinder is located on the push rod section between the working piston and the head via the linear top slide bearing. There is an adjoining top spiral spring between the working piston and the top compensating piston. The top compensating piston divides space of the cylinder between the working piston and the head into a top compensating chamber and a top combustion chamber. The bottom compensating piston and the top compensating piston have cooling grooves on their whole circumferences, whereas the working piston has a ventilation groove on its whole circumference.

Steam injectors are connected by their steam lines to two identical steam dosing devices assigned to them which are powered from a steam generator located on an exhaust pipe. Said steam generator is supplied with water from a tank.

A counter-rotating combustion engine according to the present invention comprises crank mechanism and two oppositely directed identical cylinder assemblies connected to it via an engine case. The crank mechanism constitutes a bipartite crankshaft, situated in the engine case, which consists of two identical crank half shafts. Each crank half shaft has an odd number, at least 3, of crank elements in the form of cylindrical discs situated coaxially. Crank elements are connected together on the edges via a pair of rotary shafts. Said rotary shafts of one pair are placed alternately and their axes lie in a plane assigned to them. The plane goes through a common axis of rotation of crank elements. Crank half shafts are rotationally connected together with the help of a distance bearing. Drive shafts which provide drive are projected onto free ends of crank half shafts. The crank mechanism has an even number of identical connecting rod pairs depending on a number of crank elements. Each connecting rod of a given pair is rotationally connected to one of crank half shafts by its one end via a rotary shaft assigned to it. The other ends of a connecting rod pair are connected to one of two transverse shafts in an oscillatory way. Each transverse shaft is rigidly connected to a perpendicular push rod of one of two oppositely directed cylinder assemblies. Each cylinder assembly comprises a cylinder fastened to the engine case which is closed by a head at the one side and at the engine case side it is closed by a partition that has a linear slide bearing placed in the middle. The push rod end projects out of the cylinder through the slide bearing of the partition and it is connected to connecting rods in an oscillatory way. A working piston is rigidly embedded on said push rod inside the cylinder. There is an inlet channel of compressed air and an outlet channel of exhaust gas in the middle of the cylinder. Furthermore, a top fuel injector, a top steam injector and a top ignition element are located in the head, whereas a bottom fuel injector, a bottom steam injector and a bottom ignition element are located in the partition. A bottom compensating piston sealed to the cylinder is located on the push rod section between the working piston and the partition via the linear bottom slide bearing. There is an adjoining bottom spiral spring between the working piston and the bottom compensating piston. The bottom compensating piston divides space of the cylinder between the working piston and the partition into a bottom compensating chamber and a bottom combustion chamber. A top compensating piston is located on the push rod section between the working piston and the head via the linear top slide bearing. There is an adjoining top spiral spring between the working piston and the top compensating piston. The top compensating piston divides space of the cylinder between the working piston and the head into a top compensating chamber and a top combustion chamber. The bottom compensating piston and the top compensating piston have cooling grooves on their whole circumferences, whereas the working piston has a ventilation groove on its whole circumference. The push rod end, which is not connected to a pair of connecting rods, goes through a linear slide bearing of the head placed in the head. A magnet in the form of a neodymium magnet which is placed on the push rod is inductively coupled with an inductor and together they from a power generator. Steam injectors are connected by their steam lines to two identical steam dosing devices assigned to them which are powered from a steam generator located on an exhaust pipe. Said steam generator is supplied with water from a tank.

The object of the invention is presented in the embodiment in the picture, wherein.

Figure 1:
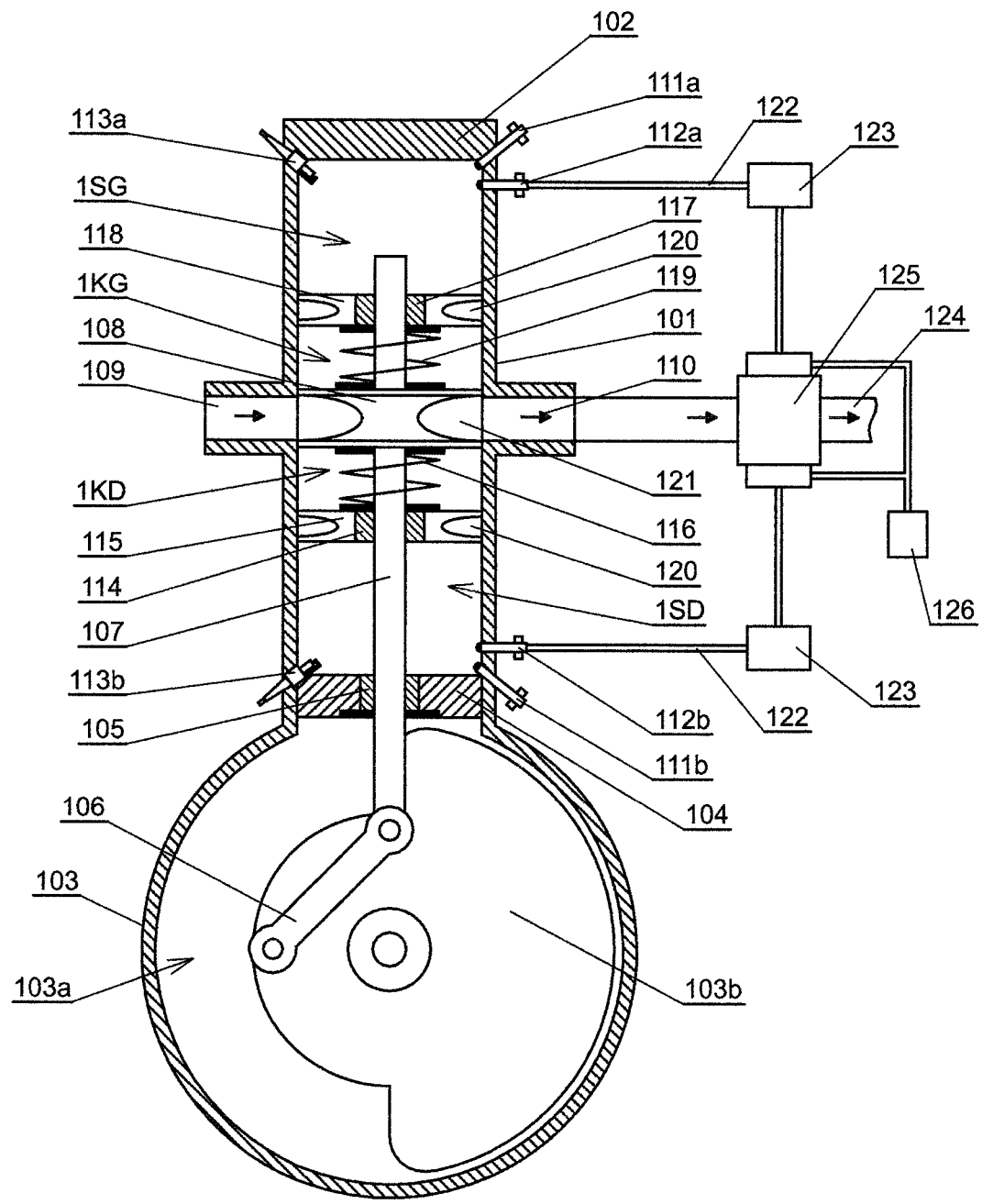
FIG. 1 illustrates a schematic diagram of an engine assembly.
Figure 2:
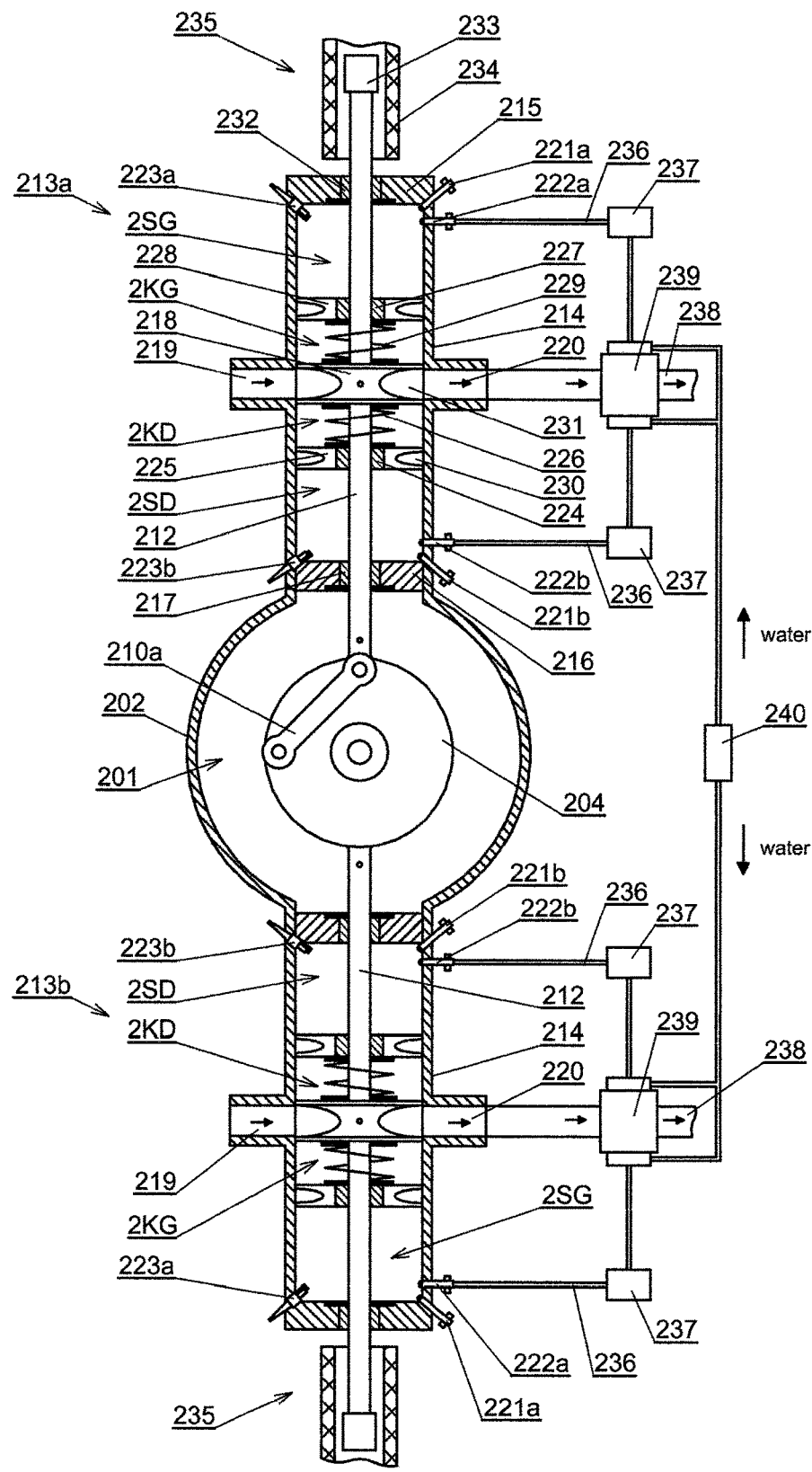
FIG. 2 is a schematic diagram of a counter-rotating engine which is constructed based on a cylinder assembly according to the present invention.
Figure 3:
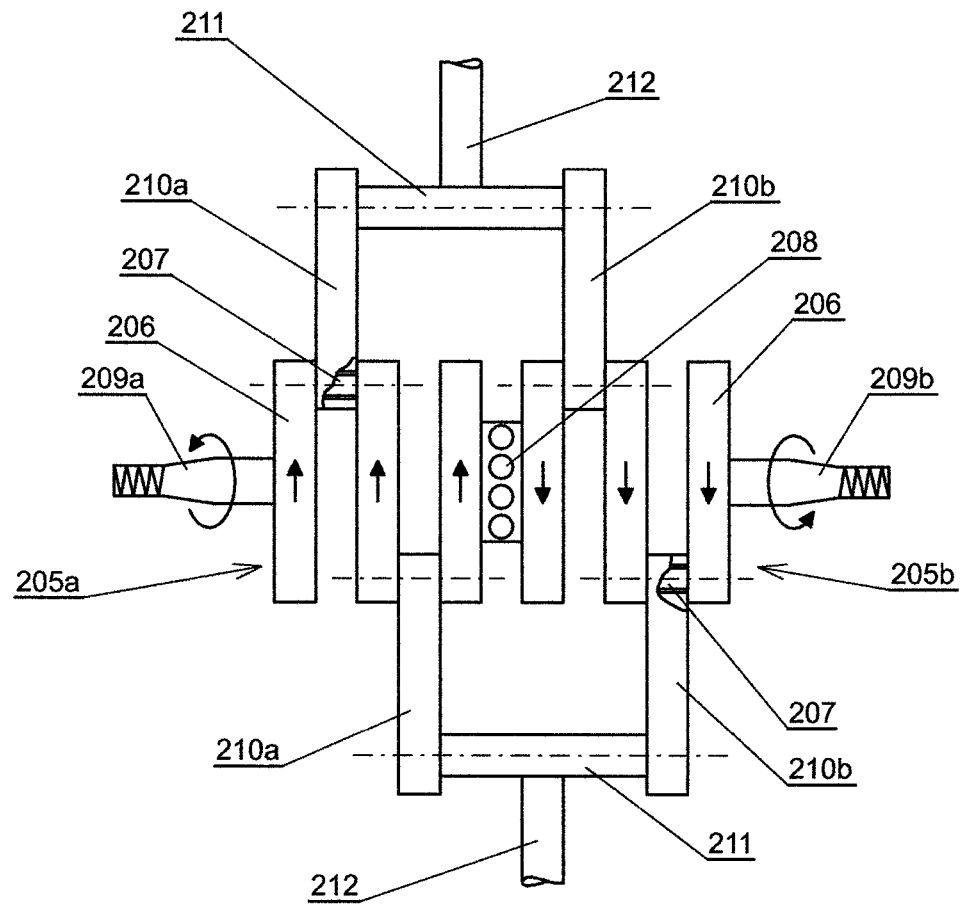
FIG. 3 shows an overview drawing of a bipartite crankshaft.

A cylinder assembly of an engine comprises a cylinder 101 which is closed by a head 102 at the one side, whereas at the engine case side 103 it is closed by a partition 104 with a linear slide bearing of a partition 105 located in the middle.

The engine case 103 closes space of a crankcase 103a, wherein a crankshaft 103b together with a counterweight is placed. The end of a push rod 107 projects out of the cylinder 101 through the linear slide bearing of the partition 105 and it is connected to a connecting rod 106 in an oscillatory way. A working piston 108 sealed to the cylinder 101 in rigidly embedded on said push rod 107 inside the cylinder 101. There is an inlet channel of compressed air 109 and an outlet channel of exhaust gas 110 in the middle of the cylinder 101. Furthermore, a top fuel injector 111a, a top steam injector 112a and a top ignition element 113a are situated in the head 102, whereas a bottom fuel injector 111b, a bottom steam injector 112b and a bottom ignition element 113b are situated in the partition 114. A bottom compensating piston 115 sealed to the cylinder 101 is located on the push rod 107 section between the working piston 108 and the partition 104 via the linear bottom slide bearing 114. There is an adjoining bottom spiral spring 116 between the working piston 108 and the bottom compensating piston 115. The bottom compensating piston 115 divides space of the cylinder 101 between the working piston 108 and the partition 104 into a bottom compensating chamber 1KD and a bottom combustion chamber 1SD. A top compensating piston 118 sealed to the cylinder 101 is located on the push rod 107 section between the working piston 108 and the head 102 via the linear top slide bearing 117. There is an adjoining top spiral spring 119 between the working piston 108 and the top compensating piston 118. The top compensating piston 118 divides space of the cylinder 101 between the working piston 108 and the head 102 into a top compensating chamber 1KG and a top combustion chamber 1SG. The bottom compensating piston 115 and the top compensating piston 118 have cooling grooves 120 on their whole circumferences, whereas the working piston has a ventilation groove 121 on its whole circumference. Steam injectors 112a and 112b are connected by their steam lines 122 to two identical steam dosing devices 123 assigned to them which are powered from a steam generator 124 located on an exhaust pipe 124. Said steam generator 124 is supplied with water from a tank 126.

The operation of the cylinder assembly. A fuel mixture in the form of a mix of hydrogen gas with air is supplied under pressure to space of a top combustion chamber 1SG via a top fuel injector 111a in the course of a forced stroke of a push rod 107 together with a working piston assembly 108, a top compensating piston 118 and a bottom compensating piston 115 towards a head 102 at the time when the top combustion chamber 1SG is separated from an inlet channel of compressed air 109 and an outlet channel of exhaust gas 110 by the top compensating piston 118. During the further upward motion of piston assemblies pressure increases in the top combustion chamber 1SG until the top compensating piston 118 reaches its TDC. A spark of a top sparking plug 113a ignites the fuel mixture shortly before the piston assemblies reach the TDC in the top combustion chamber 1SG. The temperature in the top combustion chamber 1SG grows to 7000° C. as a result of combustion of high-energy hydrogen when the pressure rapidly increases. The temperature and pressure which emerge during combustion of conventional fuels are harmful to durability of numerous engine components, in particular cylinders and pistons. In order to avoid this phenomenon a little quantity of steam is supplied under pressure by a top steam injector 112a to the top combustion chamber 1SG following the fuel mixture ignition. The timing and quantity of steam are determined in a steam dosing device 123 which is assigned to said injector. A steam generator 125 which uses heat of an exhaust pipe 124 powers the steam dosing device 123. It leads to cooling of the mixture in the top combustion chamber 1SG to the temperature of 3500° C. At the same time steam is split into oxygen and hydrogen due to the high temperature. The occurrence of an extra portion of fuel obtained in this way causes its self-ignition as well as the growth of pressure in the combustion chamber 1SG. In the course of the combustion process described above in the top combustion chamber 1SG a power stroke of the top compensating piston 118 works on a working piston 108 via a top spiral spring 119. Simultaneously the bottom compensating piston 115 begins a compression stroke phase in a bottom combustion chamber 1SD with the help of a bottom spiral spring 116 which pushes said bottom compensating piston 115. High pressure of gases, which constitute a product of hydrogen combustion in the top combustion chamber 1SG, works on the working piston 108 via the top compensating piston 118, which is movable to the push rod 107, and the top spiral spring 119 which is placed between them. In this case pressure force of exhaust gas on the top compensating piston 118 is higher than restoring force of the top spiral spring 119, which undergoes gradual bending in the course of the motion of the top compensating piston 118, which causes partial compensation of a sharp growth of pressure force of exhaust gas applied to the top compensating piston 118. Force of an air cushion which is formed in the top compensating chamber 1KG between the top compensating piston 118 and the working piston 108 reinforces compensation. As a consequence, the working piston 108 has a milder reaction to detonation processes of hydrogen combustion in the top combustion chamber 1SG as well as smoother transfer of the motion from the push rod 107, which is rigidly connected to the working piston 108, to a crankshaft 103b. The bottom combustion chamber 1SD is separated from the inlet channel of compressed air 109 and the outlet channel of exhaust gas 110 in the course of the further downward motion of the piston assembly together with the push rod 107 towards the crankshaft 103b. Subsequently a hydrogen mixture with air is supplied under pressure to space of the bottom combustion chamber 1SD with the help of a bottom fuel injector 111a. The piston assembly together with the push rod 107 which moves downward towards the crankshaft 103b causes the separation of the bottom combustion chamber 1SD from the inlet channel of compressed air 109 and the outlet channel of exhaust gas 110. Subsequently, a hydrogen mixture with air is supplied under pressure to space of the bottom combustion chamber 1SD with the help of the bottom fuel injector 111b. In the course of the further downward motion of the piston assembly pressure increases in the bottom combustion chamber 1SD until the bottom compensating piston 115 reaches close to its TDC. At the same time the top combustion chamber 1SG is connected to the inlet channel of compressed air 109 and the outlet channel of exhaust gas 110 as a result of the shift of the top compensating piston 118 to the BDC position. The top combustion chamber 1SG is scavenged by compressed air and it is prepared for the next cycle. A spark of the bottom sparking plug 113b ignites the fuel mixture shortly before the piston assembly reaches the TDC in the bottom combustion chamber 1SD. Afterwards a little quantity of steam is supplied under pressure to space of the bottom combustion chamber 1SD with the help of the bottom steam injector 112b, which brings about similar consequences as in the case of the top combustion chamber 1SG. The motion of the push rod 107 together with the working piston assembly 108, the top compensating piston 118 and the bottom compensating piston 115 shifts into the opposite direction. A power stroke of the bottom compensating piston 115 occurs in the bottom combustion chamber 1SD, which works on the working piston 108 via the bottom spiral spring 116. Simultaneously the top compensating piston 118 begins a compression stroke phase in the top combustion chamber 1SG via the top spiral spring 119. In this way the whole operation cycle of the cylinder assembly is completed. A linear reversible stroke of the push rod 107 occurs during this cycle. The bottom end of the push rod 107 enters the crankcase 103 through the tight slide bearing of the partition 105, located in the partition 104, and causes a rotational motion of the crankshaft 103b via the connecting rod 106. An air compressor, not shown, is connected to the inlet channel of compressed air 109. A strong stream of air from said air compressor goes in a continuous way through the cylinder 101 to the outlet channel of exhaust gas 110. Depending on the current position of the working piston assembly 108, the top compensating piston 118 and the bottom compensating piston 115 in the cylinder 101, air scavenges one of combustion chambers 1SG or 1SD so as to expel exhaust gases and cools it. In the central position of the working piston 108 air cools said piston by means of flowing through its ventilation groove 121 or through one of compensating chambers 1KG or 1KD and through cooling grooves 120 of one of compensating pistons 115 or 118. Scavenging air cools particular components of the piston assembly.

A counter-rotating combustion engine comprises crank mechanism 201 and two oppositely directed identical cylinder assemblies 203a and 203b which are connected to it via an engine case 202. The crank mechanism 201 constitutes a bipartite crankshaft 204, located in the engine case 202, which consists of two identical crank half shafts 205a and 205b. Each crank shaft half 205a and 205b has three crank elements 206, which are situated coaxially, in the form of cylindrical discs that are connected together on their edges by a pair of rotary shafts 207. Said rotary shafts 207 of one pair are located alternately with regard to each other and their axes lie in a plane assigned to them. The plane goes through a common axis of rotation of crank elements 206. Crank half shafts 205a and 205b are rotationally connected together with the help of a distance bearing 208. Drive shafts 209a and 209b which provide drive are projected onto free ends of crank half shafts 205a and 205b. The crank mechanism 201 has two identical connecting rod pairs 210a and 210b. Each connecting rod 210a and 210b of a given pair is rotationally connected to one of crank half shafts 205a and 205b by its one end via a rotary shaft 207 assigned to it. The other ends of connecting rod pairs 210 and 210b are connected to one of two transverse shafts 211 in an oscillatory way. Each transverse shaft 207 is rigidly connected to a perpendicular push rod 212 of one of two oppositely directed cylinder assemblies 213a and 213b. Each cylinder assembly 213a and 213b comprises a cylinder 214 fastened to the engine case 202 which is closed by a head 215 at the one side and at the engine case 202 side it is closed by a partition 216 that has a linear slide bearing of the partition 217 placed in the middle. The push rod 212 end projects out of the cylinder 214 through the slide bearing of the partition 217 and it is connected to connecting rods 210a and 210b in an oscillatory way. A working piston 218 is rigidly embedded on said push rod 212 inside the cylinder 214. There is an inlet channel of compressed air 219 and an outlet channel of exhaust gas 220 in the middle of the cylinder 214. Furthermore, a top fuel injector 221a, a top steam injector 222a and a top ignition element 223a in the form of a sparking plug are located in the head 215, whereas a bottom fuel injector 221b, a bottom steam injector 222b and a bottom ignition element 223b are located in the partition 216. A bottom compensating piston 225 sealed to the cylinder 214 is located on the push rod 212 section between the working piston 218 and the partition 216 via the linear bottom slide bearing 224. There is an adjoining bottom spiral spring 226 between the working piston 218 and the bottom compensating piston 225. The bottom compensating piston 225 divides space of the cylinder 214 between the working piston 218 and the partition 216 into a bottom compensating chamber 2KD and a bottom combustion chamber 2SD. A top compensating piston 228 sealed to the cylinder 214 is located on the push rod 212 section between the working piston 218 and the head 215 via the linear top slide bearing 227. There is an adjoining top spiral spring 229 between the working piston 218 and the top compensating piston 228. The top compensating piston 228 divides space of the cylinder 214 between the working piston 218 and the head 215 into a top compensating chamber 2KG and a top combustion chamber 2SG. The bottom compensating piston 225b and the top compensating piston 228 have cooling grooves 230 on their whole circumferences, whereas the working piston 218 has a ventilation groove 231 on its whole circumference. The push rod 212 end, which is not connected to a pair of connecting rods 210a and 210b, goes through a linear slide bearing of the head 232 placed in the head 215. A magnet 233 in the form of a neodymium magnet which is placed on the push rod 212 is inductively coupled with an inductor 234 and together they from a power generator 235. A top steam injector 222a and a bottom steam injector 222b, which are assigned to cylinder assemblies 213a and 213b, are connected by their steam lines 236 to a steam dosing device 237 which is powered from a steam generator 239 located on an exhaust pipe 238. Said steam generator 239 is supplied with water from a tank 240.

The operation of the counter-rotating combustion engine in particular work phases is identical with regard to two oppositely directed cylinder assemblies 203a and 203b which are coupled together via the crank mechanism 201. Thus, in order to simplify the description it suffices to discuss in detail the operation of one cylinder assembly 203a in connection to the operation of the crank mechanism 201, taking into account the presence of the second cylinder assembly 203b which complements the whole construction of the counter-rotating engine. A fuel mixture in the form of a mix of hydrogen gas with air is supplied under pressure to space of a top combustion chamber 2SG via a top fuel injector 221a in the course of a forced stroke of a push rod 212 together with a working piston assembly 218, a top compensating piston 228 and a bottom compensating piston 225 towards a head 215 at the time when the top combustion chamber 2SG is separated from an inlet channel of compressed air 219 and an outlet channel of exhaust gas 220 by the top compensating piston 228. During the further upward motion of piston assemblies pressure increases in the top combustion chamber 2SG until the top compensating piston 228 reaches its TDC. A spark of a top sparing plug 223a ignites the fuel mixture shortly before the piston assembly reaches the TDC in the top combustion chamber 2SG. The temperature in the top combustion chamber 2SG grows to 7000° C. as a result of combustion of high-energy hydrogen and at the same time the pressure rapidly increases. The temperature and pressure which emerge during combustion of conventional fuels are harmful to durability of numerous engine components, in particular cylinders and pistons. In order to avoid this phenomenon a little quantity of steam is supplied under pressure by a top steam injector 222a to the top combustion chamber 2SG following the fuel mixture ignition. The timing and quantity of steam are determined in a steam dosing device 237 which is assigned to said injector. A steam generator 238 which uses heat of an exhaust pipe 237 powers the steam dosing device 237. It leads to cooling of the mixture in the top combustion chamber 2SG to the temperature of 3500° C. At the same time steam is split into oxygen and hydrogen due to the high temperature. The occurrence of an extra portion of fuel obtained in this way causes its self-ignition as well as the growth of pressure in the combustion chamber 2SG. In the course of the combustion process described above in the top combustion chamber 2SG a power stroke of the top compensating piston 228 works on a working piston 218 via a top spiral spring 229. Simultaneously a bottom compensating piston 225 begins a compression stroke phase in a bottom combustion chamber 2SD with the help of a bottom spiral spring 226 which pushes said bottom compensating piston 225. High pressure of gases, which constitute a product of hydrogen combustion in the top combustion chamber 2SG, works on the working piston 218 via the top compensating piston 228, which is movable to the push rod 212, and the top spiral spring 229 which is placed between them. In this case pressure force of exhaust gas on the top compensating piston 228 is higher than restoring force of the top spiral spring 229, which undergoes gradual bending in the course of the motion of the top compensating piston 228, which causes partial compensation a sharp growth of pressure force of exhaust gas applied to the top compensating piston 228. Force of an air cushion which is formed in the top compensating chamber 2KG between the top compensating piston 228 and the working piston 218 reinforces compensation. As a consequence, the working piston 218 has a milder reaction to detonation processes of hydrogen combustion in the top combustion chamber 2SG as well as smoother transfer of the motion from the push rod 212, which is rigidly connected to the working piston 218, to a crankshaft 204. The bottom combustion chamber 2SD is separated from the inlet channel of compressed air 219 and the outlet channel of exhaust gas 220 in the course of the further downward motion of the piston assembly together with the push rod 212 towards the crankshaft 204. Subsequently, a hydrogen mixture with air is supplied under pressure to space of the bottom combustion chamber 2SD with the help of a bottom fuel injector 221a. In the course of the further downward motion of the piston assembly pressure increases in the bottom combustion chamber 2SD until the bottom compensating piston 225 reaches close to its TDC. At the same time the top combustion chamber 2SG is connected to the inlet channel of compressed air 219 and the outlet channel of exhaust gas 220 as a result of the shift of the top compensating piston 228 to the BDC position. The top combustion chamber 2SG is scavenged by compressed air and it is prepared for the next cycle. A spark of the bottom sparking plug 223b ignites the fuel mixture shortly before the piston assembly reaches the TDC in the bottom combustion chamber 2SD. Afterwards a little quantity of steam is supplied under pressure to space of the bottom combustion chamber 2SD with the help of the bottom steam injector 222b, which brings about similar consequences as in the case of the top combustion chamber 2SG. The motion of the push rod 212 together with the working piston assembly 218, the top compensating piston 228 and the bottom compensating piston 225 shifts into the opposite direction. A power stroke of the bottom compensating piston 225 occurs in the bottom combustion chamber 2SD, which works on the working piston 108 via the bottom spiral spring 226. Simultaneously the top compensating piston 228 begins a compression stroke phase in the top combustion chamber 2SG via the top spiral spring 229. In this way the whole work cycle of the cylinder assembly is completed. A linear reversible stroke of the push rod 212 occurs during this cycle. The bottom end of the push rod 212 enters inside the case 202 through the tight slide bearing of the partition 217 located in the partition 216 and then it causes a rotary motion of the bipartite crankshaft 204 via a transverse shaft 211 and a pair of connecting rods 210a and 210b. At the initial stage of the engine work, following the activation of the crankshaft 204 with the help of an external starter, different direction of rotation, which synchronizes a counter-rotating motion of pistons in both cylinder assemblies 213a and 214b, is applied to each crank half shaft 205a and 205b, which are connected together via a distance bearing 208. For example, in the first phase of a stroke of pistons towards partitions 216 each push rod 212 of both cylinder assemblies 213a and 213b presses simultaneously on the connecting rod 210a and the connecting rod 210b via the transverse shaft 211. It causes deflection and an advancing motion of the connecting rod 210a end in one direction, while the connecting rod 210b moves in the opposite direction. Similarly, in the second phase of a stroke of pistons towards heads 215, connecting rods 210a and 210b are pulled upward by push rods 212 via the transverse shaft 211. Ends of connecting rods 210a and 210b continue a circular motion around the axis of the crankshaft 204. Subsequently, those motions are transformed into oppositely directed rotary motions of crank elements 206 of both crank half shafts 205a and 205b together with drive shafts 209a and 209b which project in the opposite directions. An external air compressor, not shown, is used for scavenging so as to expel exhaust gases and for cooling cylinder assemblies 213a and 213b. A continuous air stream is provided to the inlet channel of compressed air 219 and then it goes to the outlet channel of exhaust gas 220 through the cylinder 214. Depending on the current position of the working piston assembly 218, the top compensating piston 228 and the bottom compensating piston 225 in the cylinder 214, air scavenges one of combustion chambers 2SG or 2SD so as to expel exhaust gases and cool it. In the central position of the working piston 218 air cools said piston by means of flowing through its ventilation groove 231 or through one of compensating chambers 2KG or 2KD and through cooling grooves 230 of one of compensating pistons 225 or 228. Scavenging air cools particular components of the piston assembly. The basic task of the power generator 235, which consists of a neodymium magnet 233 that is located at the end of the push rod 212 and inductively coupled with an inductor 234, is to power a HHO generator, not shown, with electric current as a complementary source of hydrogen. Furthermore, given the alternating course of received voltage on the output of the power generator 235, this course can be used for forming impulses that synchronize the ignition of an engine and the injection of fuel and steam into combustion chambers 2SD and 2SG.

Engine constructions which are based on solutions according to the present invention are characterized by a relatively great force with regard to their weight. It is related to a simple, valveless construction of a cylinder and an assembly of three pistons which enable detonation of high-energy fuel, in particular hydrogen. Thanks to those features they are especially useful for small aircraft, such as a light aircraft, an ultralight trike and drones. As regards the counter-rotating engine according to the present invention, apart from advantageous properties concerning force, it can be particularly used in helicopters with two rotors thanks to two counter-rotating drive shafts. In this case it is possible to secure rotors directly on two shafts of counter-rotating crank elements, which results in the elimination of a gyroscopic moment of rotors.

LIST OF REFERENCES

I Engine Cylinder Assembly
101 cylinder
102 head
103 engine case
103a crankcase
103b crankshaft 104 partition
105 slide bearing of partition
106 connecting rod
107 push rod
108 working piston
109 inlet channel of compressed air
110 outlet channel of exhaust gas
111a top fuel injector
111b bottom fuel injector
112a top steam injector
112b bottom steam injector
113a top sparking plug
114 bottom slide bearing
115 bottom compensating piston
116 bottom spiral spring
117 top slide bearing
118 top compensating piston
119 top spiral spring
120 cooling groove
121 ventilation groove
122 steam line
123 steam dosing device
124 exhaust pipe
125 steam generator
126 tank
1KD bottom compensating chamber
1KG top compensating chamber
1SD bottom combustion chamber
1SG top combustion chamber
II Counter-Rotating Internal Combustion Engine
201 crank mechanism
202 engine case
203a cylinder assembly
203b cylinder assembly
204 crankshaft
205a crank half shaft
205b crank half shaft
206 crank element
207 rotary shaft
208 distancing bearing
209a drive shaft
209b drive shaft
210a connecting rod
210b connecting rod
211 transverse shaft
212 push rod
213a cylinder assembly
213b cylinder assembly
214 cylinder
215 head
216 partition
217 linear bearing of partition
218 working piston
219 inlet channel of compressed air
220 outlet channel of exhaust gas
221a top fuel injector
221b bottom fuel injector
222a top steam injector
222b bottom steam injector
223a top sparking plug
223b bottom sparking plug
224 bottom slide bearing
225 bottom compensating piston
226 bottom spiral spring
227 top slide bearing
228 top compensating piston
229 top spiral spring
230 cooling groove
231 ventilation groove
232 head slide bearing
233 magnet
234 inductor
235 power generator
236 steam line
237 steam dosing device
238 exhaust pipe
239 steam generator
240 tank
2KD bottom compensating chamber
2KG top compensating chamber
2SD bottom combustion chamber
2SG top combustion chamber

The invention claimed is:

1. A cylinder assembly of an engine which comprises a cylinder with two combustion chambers which is closed by a head at one side, whereas at an engine case side the cylinder is closed by a partition with a linear bottom slide bearing of the partition located in the middle of the partition, one end of a push rod goes through the linear slide bearing of the partition, projects out of the cylinder and is connected to a connecting rod in an oscillatory engagement, a working piston is rigidly embedded on said push rod inside the cylinder, there is an inlet channel of compressed air and an outlet channel of exhaust gas in the middle of the cylinder, furthermore a hydrogen fuel injector, a steam injector and ignition element are situated in the head and in the partition, wherein a bottom compensating piston that is sealed to the cylinder is located on the push rod section between the working piston and the partition via the linear bottom slide bearing, moreover there is an adjoining bottom spiral spring between the working piston and the bottom compensating piston, while the bottom compensating piston divides space of the cylinder between the working piston and the partition into a bottom compensating chamber (IKD) and a bottom combustion chamber (1SD), a top compensating piston is located on the push rod section between the working piston and the head via a linear top slide bearing, furthermore there is an adjoining top spiral spring between the working piston and the top compensating piston, while the top compensating piston divides space of the cylinder between the working piston and the head into a top compensating chamber and a top combustion chamber, moreover the bottom compensating piston and the top compensating piston have circumferential cooling grooves, whereas the working piston has a circumferential ventilation groove.

2. The engine according to claim 1, wherein a top steam injector and a bottom steam injector are connected by steam lines to two identical steam dosing devices which are powered from a steam generator located on an exhaust pipe, while said steam generator is supplied with water from a tank.

3. A counter-rotating combustion engine which comprises a crank mechanism with two ends of a bipartite crankshaft that projects along a common axis of rotation and two oppositely directed cylinder assemblies, each cylinder assembly comprising the cylinder assembly of claim 1.

4. The engine according to claim 3, wherein a top steam injector and a bottom steam injector, which are assigned to each cylinder assembly, are connected by steam lines to a steam dosing device which is powered from a steam generator of a corresponding cylinder assembly and located on an exhaust pipe and supplied with water from a tank.

5. The engine according to claim 3, wherein a pair of push rod ends, which are not connected to a pair of connecting rods, goes through a pair of cylinder head linear slide bearings of cylinder heads of each cylinder assembly, while at the ends of the push rod there are magnets, preferably in the form of neodymium magnets, which are inductively coupled with an inductor to form a power generator.

6. The engine according to claim 3, wherein the crank mechanism has an even number of identical connecting rod pairs depending on a number of crank elements, while each connecting rod is rotationally connected to one of crank half shafts by one end via a rotary shaft, whereas the other ends of said connecting rod pairs are connected to one of two transverse shafts in an oscillatory engagement, while each transverse shaft is rigidly connected to a perpendicular push rod of one of the two oppositely directed cylinder assemblies, moreover a bottom compensating piston is sealed to the cylinder and is located on a push rod section between the working piston and the partition via the linear bottom slide bearing.

* * * * *